Sept. 29, 1953   G. J. BUTTERWORTH ET AL   2,653,389
WELL SURVEYING INSTRUMENT
Filed May 3, 1948

INVENTORS
GILBERT J. BUTTERWORTH
& EINAR T. YOUNG
BY
*Busser & Harding*
ATTORNEYS Patented Sept. 29, 1953

2,653,389

UNITED STATES PATENT OFFICE 2,653,389

WELL SURVEYING INSTRUMENT

Gilbert J. Butterworth, Chester, and Einar T. Young, Ridley Park, Pa., assignors to Sperry-Sun Well Surveying Company, Philadelphia, Pa., a corporation of Delaware Application May 3, 1948, Serial No. 24,806

15 Claims. (Cl. 33—205.5)

This invention relates to well surveying instruments and has particular reference to the type of instrument which records by electrolytic action on a record disc.

Well surveying instruments of the type disclosed in the patents to Roland Ring 2,240,417 and 2,246,319, dated, respectively, April 29, 1941, and June 17, 1941, have gone into wide and satisfactory use, these instruments producing records of inclination by electrolytic action on a disc which is sensitized so as to be marked by cathodic productions produced by electrolysis. In brief, these instruments comprise a pendulum having a pin engaging the surface of the disc so that when the pin is rendered cathodic by connection to a battery and the disc is in moistened condition the passage of a current for a short period will produce a dot on the disc, the position of which gives a measure of inclination of the instrument within a bore hole. The most satisfactory type of disc which has been found is one which is coated or impregnated with blue ferrous ferricyanide or ferric ferrocyanide and a soluble electrolytic salt as described in said Ring Patent 2,246,319. The alkaline materials formed at the pin cathode react with the colored material producing a white spot visible readily against the blue background.

While proposals have been made as in the earlier of said Ring patents for securing records of the azimuth of the inclination as well as the inclination, these proposals lead to complications and constructions which are susceptible to damage in use and, consequently, this type of instrument has not heretofore been well adapted for the practical recording of azimuthal direction.

The broad object of the present invention is the provision of an instrument of this same general type so far as mode of recording is concerned, which is suitable for recording of direction as well as inclination, the construction of the instrument being rugged so that it is as little liable to damage in use as the instruments which have been used for recording inclination only.

Figure 1A:
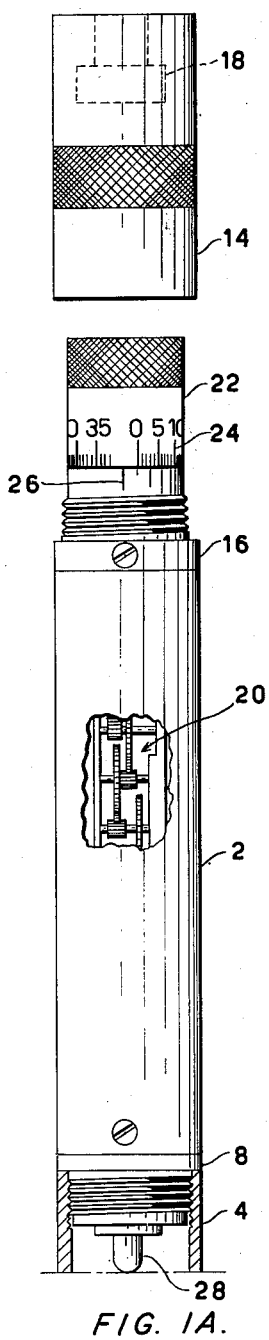
Figure 1B:
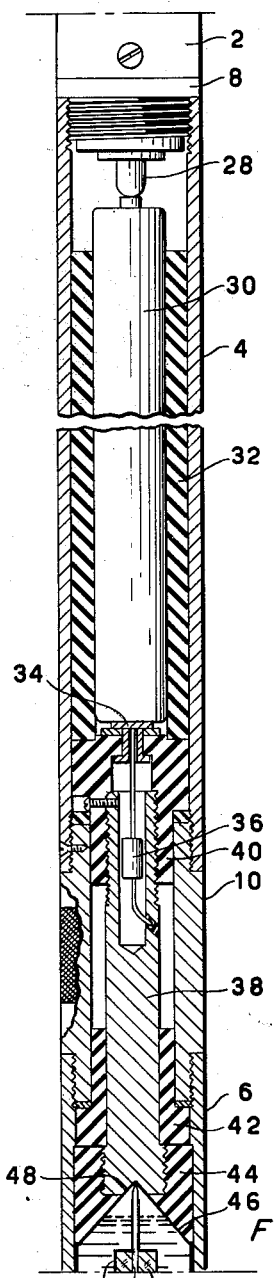
Figure 1C:
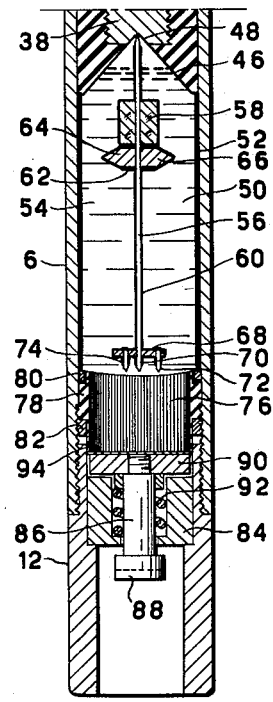
Figure 2:
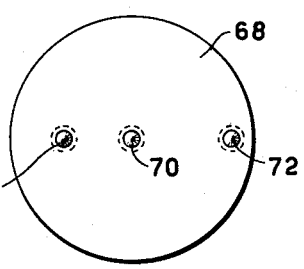

This broad object of the invention as well as more specific objects particularly relating to details of construction and operation will become apparent from the following description read in conjunction with the accompanying drawing in which:

Figures 1A, 1B and 1C are a series of sectional views showing in order the upper, intermediate and lower portions of an instrument constructed in accordance with the invention; and Figure 2 is an enlarged detail showing in particular the underside of a floating pendulum.

The illustrated embodiment of the invention comprises tubes 2, 4 and 6 which are coupled together by means of threaded coupling members 8 and 10. The lowermost tube 6 has threaded to it a bottom closure member 12 while a coupling 16 surmounting the upper tube 2 is provided with threads to receive a cap 14 which is provided with a T-slot 18 arranged to receive a bolt to support the instrument in a protective casing in the usual fashion.

Within the uppermost tube 2 is a timing mechanism 20 which forms no part of the present invention and which is disclosed in detail in the application of Roland Ring, Serial Number 629,052, filed November 16, 1945. As disclosed in said application this timing mechanism is provided with a winding knob 22 provided with time markings 24 readable against an index marking 26 on the coupling 16. The upper cap 14 protects this winding knob against dirt and damage. Projecting from the coupling 8 is a contact plunger 28 which is engageable with the positive pole of a battery 30 located within an insulating tube 32 in the tube 4.

As will be hereinafter more fully pointed out in detail the operation of timing mechanism 20 is arranged to interrupt the circuit from the positive pole of the battery to the ground constituted by the metallic casing of the instrument after a predetermined time when the instrument is used in go-devil fashion. The timing mechanism 20 may be replaced by other timing or current interrupting devices as exemplified, for example, by those illustrated in the following patents: Smith 2,301,757, dated November 10, 1942, Kothny 2,317,386, dated April 27, 1943, Emerson et al. 2,412,976, dated December 24, 1946, Kothny 2,415,249, dated February 4, 1947, and Kothny 2,424,358, dated July 22, 1947.

The battery 30 may comprise a suitable number of cells arranged in series in flashlight fashion so that a negative pole is exposed at the bottom thereof resting upon and forming electrical contact with a button 34. This button is, in turn, electrically connected through a resistor 36 having a high resistance with a metallic pin member 38 which is supported so as to be insulated from the casing by insulating inserts 40 and 42. The parts so far described are essentially conventional in their assembly and electrical arrangement with those heretofore provided in inclination instruments of this type with the exception that the pin 38 is differently formed at its lower end for association with a floating pendulum.

The pin 38 carries an insulating member 44 having a conical bottom 46 in continuation of a conical depression 48 in the lower end of the pin 38.

The interior of the tube 6 provides a chamber 50, the walls of which are interiorly insulated by a thin insulating tube indicated at 52, which, if desired, may be replaced by an equivalent lacquer coating. This chamber is almost completely filled with a liquid 54 such as ethylene glycol which has a rather high electrical resistance. An air bubble is left within the chamber, however, so that under all ordinary conditions of inclination for which the instrument will make records the liquid surface does not contact the lower end of the pin 38.

A floating pendulum in the chamber 50 is provided by a pin 56 having a conical upper end and carrying a float 58 and a tube 62, for example of brass, within which are located a pair of magnets 64 and 66 presenting outwardly unlike poles. These magnets are desirably powerful permanent magnets such as may be formed of Alnico or other similar compositions. At its lower end the pin 56 carries a metallic disc 68 through which there projects the lower pointed end 70 of the pin 56. The disc 68 also carries additional conically pointed pins 72 and 74. These pins may be secured in holes in the metallic disc 68 by solder. The pins 70, 72 and 74 are located in the axial plane of the axis of the permanent magnet constituted by the magnet members 64 and 66. As will be noted particularly from the enlarged picture the spacing between the pins 72 and 70 is greater than the spacing between the pins 74 and 70 and consequently the arrangement has a definite configuration relative to the polarity of the permanent magnet arrangement. For simplicity of description it may be assumed herein that the pin 72 in its relation to the pin 70 is in the direction of the north seeking end of the permanent magnet.

The entire pendulum assembly is coated with an insulating varnish indicated at 60 except for the conical upper end of the pin 56 and the conical lower ends of the pins 70, 72 and 74. The pendulum is so balanced that when the instrument is vertical as illustrated in Figure 1C and the pendulum is held upward by the buoyant float (which may be of cork) the axis of the pendulum pin 56 is vertical and coincident with the axis of the instrument, with its pointed upper end located in the apex of the conical depression 48 in the pin 38. To accomplish this balance in the particular liquid employed, the buoyant force must be greater than the weight of the pendulum, and the product of the buoyant force times the distance from the upper end of the pin 56 to the center of buoyancy of the pendulum must be less than the product of the weight of the pendulum times the distance from the upper end of the pin 56 to the center of gravity of the pendulum. As will be evident, when the instrument is inclined the pendulum will also remain vertical so that the angle between the pendulum axis and the instrument axis will be equal to the angle of inclination of the instrument. To provide freedom of relative tilting, the vertex angle of the conical depression 48 is, of course, greater than that of the upper end of the pin 56.

The bottom of the chamber 50 is closed by a member comprising a bundle of insulated wires 76 carried within an insulating sleeve 78. The wires of this bundle are very fine, for example, about 0.005 inch in diameter or less, insulated by a coating of enamel in the usual fashion for insulation of such fine wire. The construction of this bundle is accomplished by binding a bundle of such wires, held in a holder, with convolutions of a fabric tape impregnated with a thermosetting resin. All of the spaces between the wires are also impregnated with a resinous material so that the finished mosaic will withstand considerable pressure and will remain liquid tight. By subjecting the assembly to suitable heat the thermoplastic material is hardened and, therefore, the whole assembly may be machined to produce shoulders as indicated on the insulating sleeve and to provide a plane surface at the lower ends of the wires of the bundle, and at their upper ends a spherical surface which after assembly will have as its center the apex of the conical depression 48. The wire bundle is held in position by a ring 82 threaded in the lower end of the tube 6 which presses it against the lower end of a washer 80 fixed beneath the insulating tube 52. The arrangement is such as indicated in Figure 1C with the conical points of the pins 70, 72 and 74 just clearing the spherical surface of the wires, the outer pins 72 and 74 being of a suitable length to insure such clearance despite their positions spaced from the axis of the pin 56.

The lower closure member 12 carries a metallic insert 84 in which is slidable a pin 86 provided with a head 88. The upper end of this pin carries a supporting disc 90 and the pin is urged upwardly by a spring 92. When the closure 12 is removed from the instrument the spring 92 moves the support 90 to a position just below the upper peripheral edge of the closure 12 so that there may be located thereon, but within said upper edge, a record disc 94 which is of the type previously described, subject to discoloration or bleaching by electrolytic action when it is moistened.

As will be evident from what has been described, when an assembly of the instrument is made with the disc 94 in position as illustrated, an electrical configuration is produced as follows:

The positive terminal of the battery 30 may be grounded to the casing through the timing mechanism 20.

The negative lower terminal of the battery is grounded only through the following successive elements: button 34, resistor 36, pin 38, pendulum pin 56, the three pointed pins 70, 72 and 74 in parallel, the liquid 54 adjacent their points, wires of the bundle 76, the moistened disc 94, support 90 and the spring 92 and/or pin 86.

Forgetting for the present the action of the timing mechanism 20, the positive upper pole of the battery 30 may be regarded as permanently grounded; in fact, in the case of wire line operation this timing mechanism may be omitted altogether and the pin 28 may be directly grounded, for example, through the supporting bolt engaged within a T-slot such as 18. Even with the timing mechanism, after it has been set, the positive pole is grounded until the timing mechanism acts to interrupt the electrical circuit.

The instrument is prepared for operation by moistening the disc 94, locating it upon the support 90 and then threading the closure 12 into the bottom of the instrument. The discs 94 which are preferably used are provided with gelatine upper surfaces containing the pigment which is to be discolored, and when the lower closure is put in place the disc is pressed tightly by the spring 92 flatwise in engagement with the lower exposed ends of the bundle of insulated wires. As will be evident these wires then present to the disc a mosaic of conductive areas which are insulated from each other.

As the instrument is lowered within a hole, agitation occurs with the result that the pendulum is continuously swinging during the lowering relative to the bundle of wires. The electrolytic action is sufficiently slow so that no perceptible marking of the record disc occurs during this lowering operation.

When the instrument reaches a position at which a record is to be made and the pendulum comes to rest, an action which occurs very quickly due to the damping action of the liquid 54, the pendulum will be inclined with respect to the axis of the instrument at an angle equal to the angle of inclination of the hole. Due to the action of the magnet the pendulum will also swing about its axis to a position in which the magnet is oriented in the magnetic field of the earth. (It will, of course, be understood that all portions of the instrument in the vicinity of the magnet are of non-magnetic material, including the protective casing.) Under these conditions the pins 72 and 74 will be oriented in the magnetic field of the earth with the pin 72, in line with the assumption previously made, toward the north. The current path from the negative pole of the battery to ground is now as previously indicated but with the current following parallel paths through the pins 70, 72 and 74 and those wires of the bundle which are closest to the lower ends of these pins. Due to the relatively high resistance of the liquid 54 the major flow of current from each of the pins is from it directly to the exposed wire which is located immediately below it. Some current, of course, will pass to adjacent wires but, in general, from each pin the flow of current will occur, so far as resulting action is concerned, to substantially no more than three of the wires of the bundle. To the points there is presented a mosaic which, at the spherical surface of the bundle, presents conductive areas directly aligned with the conductive areas presented to the record disc with each of the former areas corresponding to a definite one of the latter areas, i. e., the corresponding areas being those of the opposite ends of the wires. The result, in effect, is a substantially direct projection of the current from the several points 70, 72 and 74 to corresponding points on the record disc. In the formation of the bundle due care is, of course, taken that the wires are parallel when they are bound together. As a consequence, flows through three points of the record disc very accurately correspond in position to the points 70, 72 and 74, the degree of inaccuracy being substantially only that corresponding to the diameters of the wires.

If the wires of the bundle 76 are very fine, as described, the fact that current might, at times, be substantially equally distributed through three, or even more, adjacent wires will have little effect on the results, there being produced at worst only a slightly larger spot on the record disc where this occurs. The center of even a large spot is accurately indicative of a pin location.

By permitting the instrument to remain at rest for a predetermined period of the order, for example, of one to five minutes, there will be produced on the record disc discolored or bleached spots resulting from electrolytic action of the current on the salt or salts therein, specifically the formation of alkali at the lower ends of the wires which will bleach the colored material in the gelatine of the disc when the discs are of the particular type referred to above.

If wire line operation is used and the timing mechanism 20 is omitted the instrument may then be brought to the surface during which travel the pendulum will again be agitated so that no substantial recording would occur during its rise. While current flows continuously it will not flow through any particular point of the record disc for a sufficient period to produce a visible record. By removing the record disc at the surface there may then be observed the three spots thereon. The deviation of the center spot from the center of the disc will give the inclination while a line drawn through the three spots will indicate the direction, the widest spacing of the spots being indicative of the north direction. The discs used may be of the type commonly used for recording inclination only and may be preprinted, as is customary, with concentric circles graduated in terms of inclination angle.

Other arrangements of pins to indicate direction are, of course, possible. For example a single pin such as 72 having a chisel-shaped point may be used with the center-indicating pin 70, such a point giving a dash marking on the record distinguishing it from the substantially circular mark produced by pin 70.

The purpose of the timing mechanism is to prevent the formation of a duplicate record if, during removal of the instrument from the hole, it is brought to rest for any substantial period of time. This type of operation is fully discussed in the patents above mentioned relating to timing devices: in brief, when the instrument is used in go-devil fashion it is dropped within a drill string, permitted to come to rest at the bottom, and then removed when the drill string is removed from the hole. Usually in such cases before the instrument is recovered the removal of the drill string will be interrupted and for this reason it is desirable to break the electrical circuit through the use of the timing device after such predetermined period as is estimated as necessary for the instrument to reach the bottom of the hole and make the desired record. Since this instrument is magnetic in character it will be necessary when using it in this go-devil fashion to provide near the lower end of the drill string a sub of non-magnetic material in which it may come to rest, the non-magnetic sub preventing interference with the magnet by the steel forming the major part of the drill string. Such subs are commonly used in surveying with magnetic directional instruments of photographic type.

It will be evident from the above that there is no possibility of damage to the sensitive pendulum in the handling of the apparatus since the pendulum chamber is permanently closed. Even though closed the position of the pendulum points will be transmitted through the mosaic arrangement of the wire bundle to the recording disc.

It may be noted that the floating nature of the pendulum precludes the existence of any substantial friction which would prevent its proper orientation. A suspended pendulum would produce sufficient friction to prevent accurate orientation; but the metal-to-metal friction between the upper point of the pendulum rod 56 and the apex of the depression 48 exerts only a very minute torque with the result that accurate orientation is secured. While liquid friction exerts a damping action it will not prevent the ultimate rotation of the pendulum to the desired accurate position. It is, of course, within the scope of the invention to provide the floating pendulum and mosaic arrangement in an inclinometer for recording inclination only.

It will be clear that various changes may be made in details of the invention without departing from its scope as defined in the following claims. For example, by the use of a high voltage supply, for example from a spark coil, instead of a low voltage supply, to the pendulum, sparks may jump gaps constituted by a non-conducting liquid and even an air gap beneath the conductor bundle to mark a record member sensitive to passage of current under high voltage; for example in a fashion similar to that involved in Smith Patent 2,152,671, dated April 4, 1939.

What we claim and desire to protect by Letters Patent is:

1. A well surveying instrument comprising a casing having a chamber therein, means providing a socket in said chamber, an electrically conductive liquid in the chamber, a floating pendulum in the chamber having a pivot point buoyed by said liquid into said socket, said pendulum including magnetized means providing a compass and a plurality of electrically conducting points at its lower end having a fixed relationship with said compass, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of substantially coplanar conducting areas, the first mentioned mosaic lying substantially in a spherical surface having as its center said socket, and having slight clearance with the conducting points of the pendulum, means for supporting a record member in contact with the second mentioned mosaic, and means providing flow of electrical current through the pendulum and the points thereof, said liquid, conductors of said bundle, and said record member and its supporting means, so that said record member may be marked by electrolytic action in accordance with the position of the pendulum relative to the casing.

2. A well surveying instrument comprising a casing having a chamber therein, means providing a socket in said chamber, an electrically conductive liquid in the chamber, a floating pendulum in the chamber having a pivot point buoyed by said liquid into said socket, said pendulum including an electrically conducting point at its lower end, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of substantially coplanar conducting areas, the first mentioned mosaic lying substantially in a spherical surface having as its center said socket, and having slight clearance with the conducting point of the pendulum, means for supporting a record member in contact with the second mentioned mosaic, and means providing flow of electrical current through the pendulum and the point thereof, said liquid, a conductor of said bundle, and said record member and its supporting means, so that said record member may be marked by electrolytic action in accordance with the position of the pendulum relative to the casing.

3. A well surveying instrument comprising a casing having a chamber therein, means providing a socket in said chamber, an electrically conductive liquid in the chamber, a floating pendulum in the chamber having a pivot point buoyed by said liquid into said socket, said pendulum including magnetized means providing a compass and a plurality of electrically conducting points at its lower end having a fixed relationship with said compass, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of conducting areas, the first mentioned mosaic lying substantially in a spherical surface having as its center said socket, and having slight clearance with the conducting points of the pendulum, means for supporting a record member in contact with the second mentioned mosaic, and means providing flow of electrical current through the pendulum and the points thereof, said liquid, conductors of said bundle, and said record member and its supporting means, so that said record member may be marked by electrolytic action in accordance with the position of the pendulum relative to the casing.

4. A well surveying instrument comprising a casing having a chamber therein, means providing a socket in said chamber, an electrically conductive liquid in the chamber, a floating pendulum in the chamber having a pivot point buoyed by said liquid into said socket, said pendulum including an electrically conducting point at its lower end, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of conducting areas, the first mentioned mosaic lying substantially in a spherical surface having as its center said socket, and having slight clearance with the conducting point of the pendulum, means for supporting a record member in contact with the second mentioned mosaic, and means providing flow of electrical current through the pendulum and the point thereof, said liquid, a conductor of said bundle, and said record member and its supporting means, so that said record member may be marked by electrolytic action in accordance with the position of the pendulum relative to the casing.

5. A well surveying instrument comprising a casing having a chamber therein, means providing a socket in said chamber, an electrically conductive liquid in the chamber, a floating pendulum in the chamber having a pivot point buoyed by said liquid into said socket, said pendulum including magnetized means providing a compass and a plurality of electrically conducting points at its lower end having a fixed relationship with said compass, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of substantially coplanar conducting areas, the first mentioned mosaic having slight clearance with the conducting points of the pendulum, means for supporting a record member in contact with the second mentioned mosaic, and means providing flow of electrical current through the pendulum and the points thereof, said liquid, conductors of said bundle, and said record member and its supporting means, so that said record member may be marked by electrolytic action in accordance with the position of the pendulum relative to the casing.

6. A well surveying instrument comprising a casing having a chamber therein, means providing a socket in said chamber, an electrically conductive liquid in the chamber, a floating pendulum in the chamber having a pivot point buoyed by said liquid into said socket, said pendulum including an electrically conducting point at its lower end, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of substantially coplanar conducting areas, the first mentioned mosaic having slight clearance with the conducting point of the pendulum, means for supporting a record member in contact with the second mentioned mosaic, and means providing flow of electrical current through the pendulum and the point thereof, said liquid, a conductor of said bundle, and said record member and its supporting means, so that said record member may be marked by electrolytic action in accordance with the position of the pendulum relative to the casing.

7. A well surveying instrument comprising a casing having a chamber therein, means providing a socket in said chamber, an electrically conductive liquid in the chamber, a floating pendulum in the chamber having a pivot point buoyed by said liquid into said socket, said pendulum including magnetized means providing a compass and a plurality of electrically conducting points at its lower end having a fixed relationship with said compass, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of conducting areas, the first mentioned mosaic having slight clearance with the conducting points of the pendulum, means for supporting a record member in contact with the second mentioned mosaic, and means providing flow of electrical current through the pendulum and the points thereof, said liquid, conductors of said bundle, and said record member and its supporting means, so that said record member may be marked by electrolytic action in accordance with the position of the pendulum relative to the casing.

8. A well surveying instrument comprising a casing having a chamber therein, means providing a socket in said chamber, an electrically conductive liquid in the chamber, a floating pendulum in the chamber having a pivot point buoyed by said liquid into said socket, said pendulum including an electrically conducting point at its lower end, means providing a closure for the bottom of said chamber, the last mentioned means comprising a bundle of substantially parallel conductors, insulated from each other, and presenting to the liquid in the chamber a mosaic of conducting areas and presenting at its outer face a corresponding mosaic of conducting areas, the first mentioned mosaic having slight clearance with the conducting point of the pendulum, means for supporting a record member in contact with the second mentioned mosaic, and means providing flow of electrical current through the pendulum and the point thereof, said liquid, a conductor of said bundle, and said record member an its supporting means, so that said record member may be marked by electrolytic action in accordance with the position of the pendulum relative to the casing.

9. A well surveying instrument comprising a casing having a chamber therein, an electrically conductive liquid in the chamber, a pendulum in the chamber, means providing a pivot for said pendulum, said pendulum including magnetized means providing a compass and a plurality of electrically conducting points at its free end having a fixed relationship with said compass, means providing a closure for the end of the chamber adjacent to said points comprising a bundle of conductors, insulated from each other, and presenting towards said points a mosaic of conducting areas and presenting outwardly a corresponding mosaic of conducting areas, the first mentioned mosaic lying substantially in a spherical surface having as its center the pivot for the pendulum, and having slight clearance with the conducting points of the pendulum, means for locating a record member adjacent to the second mentioned mosaic, and means providing flow of electrical current through the pendulum and the points thereof, said liquid, conductors of said bundle, and said record member and its locating means, so that said record member may be marked in accordance with the position of the pendulum relative to the casing.

10. A well surveying instrument comprising a casing having a chamber therein, an electrically conductive liquid in the chamber, a pendulum in the chamber, means providing a pivot for said pendulum, said pendulum including an electrically conducting point at its free end, means providing a closure for the end of the chamber adjacent to said point comprising a bundle of conductors, insulated from each other, and presenting towards said point a mosaic of conducting areas and presenting outwardly a corresponding mosaic of conducting areas, the first mentioned mosaic lying substantially in a spherical surface having as its center the pivot for the pendulum, and having slight clearance with the conducting point of the pendulum, means for locating a record member adjacent to the second mentioned mosaic, and means providing flow of electrical current through the pendulum and the point thereof, said liquid, a conductor of said bundle, and said record member and its locating means, so that said record member may be marked in accordance with the position of the pendulum relative to the casing.

11. A well surveying instrument comprising a casing having a chamber therein, an electrically conductive liquid in the chamber, a pendulum in the chamber, means providing a pivot for said pendulum, said pendulum including magnetized means providing a compass and a plurality of electrically conducting points at its free end having a fixed relationship with said compass, means providing a closure for the end of the chamber adjacent to said points comprising a bundle of conductors, insulated from each other, and presenting towards said points of mosaic of conducting areas and presenting outwardly a corresponding mosaic of conducting areas, the first mentioned mosaic having slight clearance with the conducting points of the pendulum, means for locating a record member adjacent to the second mentioned mosaic, and means providing flow of electrical current through the pendulum and the points thereof, said liquid, conductors of said bundle, and said record member and its locating means, so that said record member may be marked in accordance with the position of the pendulum relative to the casing.

12. A well surveying instrument comprising a casing having a chamber therein, an electrically conductive liquid in the chamber, a pendulum in the chamber, means providing a pivot for said pendulum, said pendulum including an electrically conducting point at its free end, means providing a closure for the end of the chamber adjacent to said point comprising a bundle of conductors, insulated from each other, and presenting towards said point a mosaic of conducting areas and presenting outwardly a corresponding mosaic of conducting areas, the first mentioned mosaic having slight clearance with the conducting point of the pendulum, means for locating a record member adjacent to the second mentioned mosaic, and means providing flow of electrical current through the pendulum and the point thereof, said liquid, a conductor of said bundle, and said record member and its locating means, so that said record member may be marked in accordance with the position of the pendulum relative to the casing.

13. A well surveying instrument comprising a casing having a chamber therein, means providing a socket in said chamber, an electrically conductive liquid in the chamber, a floating pendulum in the chamber having a pivot point buoyed by said liquid into said socket, said pendulum including magnetized means providing a compass and a plurality of conducting points at its lower end having a fixed relationship with said compass, means providing a closure for the bottom of said chamber, means for locating a record member in fixed relationship with the axis of the casing and externally of said closure, and means providing flow of electrical current through the pendulum and the points thereof and said record member and its locating means so that said record member may be marked in accordance with the position of the pendulum relative to the casing.

14. A well surveying instrument comprising a casing having a chamber therein, means providing a socket in said chamber, an electrically conductive liquid in the chamber, a floating pendulum in the chamber having a pivot point buoyed by said liquid into said socket, said pendulum including a conducting point at its lower end, means providing a closure for the bottom of said chamber, means for locating a record member in fixed relationship with the axis of the casing and externally of said closure, and means providing flow of electrical current through the pendulum and the point thereof and said record member and its locating means so that said record member may be marked in accordance with the position of the pendulum relative to the casing.

15. A well surveying instrument comprising a casing having a chamber therein, a pendulum in the chamber, means providing a pivot for said pendulum, said pendulum including magnetized means providing a compass and a plurality of electrically conducting points at its free end having a fixed relationship with said compass, means for locating a record member in fixed relationship with the axis of the casing and externally of said closure, and means providing flow of electrical current through the points thereof and said record member and its locating means so that said record member may be marked in accordance with the position of the pendulum relative to the casing.

GILBERT J. BUTTERWORTH.
EINAR T. YOUNG.

References Cited in the file of this patent

UNITED STATES PATENTS

| Number | Name | Date |
|---|---|---|
| 907,235 | Herrick | Dec. 22, 1908 |
| 978,942 | Schuette | Dec. 20, 1910 |
| 1,376,727 | Pentz | May 3, 1921 |
| 1,837,479 | Pew | Dec. 22, 1931 |
| 1,916,301 | Cole | July 4, 1933 |
| 1,928,644 | Bunker | Oct. 3, 1933 |
| 2,124,892 | Nichols | July 26, 1938 |
| 2,132,168 | Klein | Oct. 4, 1938 |
| 2,152,671 | Smith | Apr. 4, 1939 |
| 2,167,071 | Hendrickson | July 25, 1939 |
| 2,189,560 | Culbertson | Feb. 6, 1940 |
| 2,232,360 | Barnett | Feb. 18, 1941 |
| 2,246,319 | Ring | June 17, 1941 |
| 2,268,682 | Webb | Jan. 6, 1942 |
| 2,317,386 | Kothny | Apr. 27, 1943 |
| 2,415,249 | Kothny | Feb. 4, 1947 |
| 2,419,468 | Smith | Apr. 22, 1947 |
| 1,695,668 | Siebers | Dec. 18, 1947 |
| 2,501,791 | Silverman | Mar. 28, 1950 |

FOREIGN PATENTS

| Number | Country | Date |
|---|---|---|
| 7,203 | Great Britain | 1903 |
| 117,161 | Great Britain | 1918 |